United States Patent Office 2,724,662
Patented Nov. 22, 1955

2,724,662

METHOD OF IMPROVING ACID RESISTANCE OF GLASS COLOR

Ray Andrews and Robert S. Murray, Washington, Pa., assignors to B. F. Drakenfield & Co., New York, N. Y., a corporation of New York No Drawing. Application March 9, 1953, Serial No. 341,352

4 Claims. (Cl. 117—103)

This invention relates to a method of improving the acid resistance of vitrified glass colors.

The term "glass colors" is used herein in accordance with its trade meaning. It connotes vitrifiable compositions composed of a finely divided glassy frit, sometimes called a flux, with which there is commonly associated at least one agent for conferring color or opacity, or both, and which may be fused into the frit in its production or added as a mill addition in grinding the color preparatory to its use.

These glass colors are applied to ceramic, i. e., noncombustible, articles, for instance glassware, tableware, etc., to provide decorative or other effects such, for example, as descriptive matter. They are applied in a wide variety of ways including spraying, screen stencil printing, hand banding, and by decalcomania and other types of transfer. After the color is applied the articles are heated to melt the color and bond it permanently to the underlying base.

In one widely used type of glass color the frit is essentially a lead borosilicate. For many purposes it is desirable that the fired color possess acid resistance, for instance because ware attacked by acid loses its luster and the appearance is impaired. Besides, lead is deleterious to health and is undesirable.

The so-called acid resistant glass colors have been developed and used widely for those reasons. They generally comprise a lead borosilicate frit containing also titania ($TiO_2$) or zirconia ($ZrO_2$) or both, and they may contain lithia ($Li_2O$) and either or both sodium oxide and potassium oxide. They possess substantially better acid resistance than simple lead borosilicate frits but even so they are subject to sufficient acid attack that further improvement in resistance would be desirable and of major importance. However, despite all efforts to that end known to us, the presently available glass colors seemed to have been developed to the point of maximum acid resistance compatible with the other factors that must be considered in the development of glass colors, e. g., such factors as fusibility, appearance and cost.

It is among the objects of the invention to provide a method of improving the acid resistance of glass colors that is simple, may be practiced easily and inexpensively with existing equipment, that requires no alteration in the composition of the presently available colors of the acid resistant type, and that effectively reduces substantially the acid dissolution of lead from the fired color.

Other objects will be recognized from the following specification.

We have discovered, and it is upon this that the invention is primarily predicated, that the acid resistance of glass colors of the acid resistant type is increased substantially by surrounding, during the firing operation, at least that portion of the article carrying glass color with an atmosphere containing steam. Thereby, for some reason that is at present unknown to us, the resistance to acid attack of the fused glass color is appreciably increased.

The invention is applicable to the firing of glass colors by progressive movement through continuous lehrs, whether of the open fired or closed muffle type. It is applicable equally to the firing of glass colors under stationary conditions in any type of furnace. The criterion in each instance is that there be steam supplied to the atmosphere during firing of the color.

Although it suffices simply to surround that portion of the article which carries glass color with this atmosphere containing steam, as a practical matter the preferred practice involves maintaining the entire article in such an atmosphere. We have found that as little as 5 per cent of steam in the atmosphere surrounding the article while the color fuses, or matures, suffices. However, for many purposes it is preferred that the atmosphere be 100 per cent steam, and for most purposes it is preferred to supply it as dry, or superheated, steam.

While the steam-containing atmosphere might be supplied during the entire firing operation, we find that that is unnecessary and that it suffices simply to supply such atmosphere in the zone, or during the interval, in which the color reaches and maintains fluidity, i. e., the zone of firing temperature. This is accomplished by introducing the steam, e. g., as dry steam, in the proper amount into that zone. With most, or many, acid resistant colors this involves supplying the said atmosphere when the article being fired is in the range from about 900° to 1300° F.

As exemplifying the benefits to be derived from the invention, one glass color that has been considered to be of exceptionally good acid resistance showed, after firing under normal conditions, five parts per million (p. p. m.) of soluble lead when tested according to a standard procedure. The same color when fired under the same conditions except that the atmosphere was essentially 100 per cent steam showed, by the same test, less than 2 p. p. m. of soluble lead.

In another instance a less resistant color showed lead solubility of 90 p. p. m. when fired normally, which was reduced to 15 p. p. m. when fired at the same temperature but in accordance with this invention.

In yet another case a flux containing no pigment showed 200 p. p. m. lead solubility after normal firing whereas when fired at the same temperature but in an atmosphere of 100 per cent steam the solubility of lead was reduced to 5 p. p. m., showing the extraordinary benefit of the present invention.

As indicated above, the reason why the resistance of acid resistant glass colors is greatly benefited by the simple expedient of fusing them to a base article in an atmosphere containing at least 5 per cent of steam is not known to us, nor is it explicable on the basis of the facts that we have developed. For example, although the acid resistance of such colors is enhanced substantially, the resistance to alkali remains unaffected. Again, if acid resistant colors fired in accordance with our invention are refired under normal conditions the improved resistance is lost. Furthermore, the resistance to acid is not improved if instead of steam there be used atmospheres of carbon monoxide (CO), carbon dioxide ($CO_2$), nitrogen ($N_2$) or sulfur dioxide ($SO_2$). Whatever be the real reason for the improved acid resistance, we find that it is apparently a surface phenomenon for if glass colors fired in accordance with this invention are treated with an agent to remove surface gloss, the color then shows essentially the resistance to acid that it would have if fired under normal conditions. Thus, in the case of the flux containing no pigment referred to above, and which showed lead solubility of 5 p. p. m. after firing in accordance with this invention, the removal of surface gloss with a 1.5 per cent solution of ammonium bifluoride ($NH_4HF_2$) resulted in solubility of 200 p. p. m. of lead, which is that which would have resulted when the flux was fired under normal conditions.

As indicated above, the trade is familiar with the acid resistant glass colors with which this invention is concerned. However, reference may be made to two types, by way of illustration but in no sense to limit the practice of the invention to them for it is applicable generally to the acid resistant vitreous colors, enamels or fluxes. One type of acid resistant vitreous enamel comprises from 60 to 65 per cent of PbO, from 30 to 35 per cent of $SiO_2$, from 0 to 4 per cent of $B_2O_3$, and from 0 to 2 per cent of $Na_2O$. To this base composition there may be added opacifying or coloring substances, or both. As a further example, a known acid resistant enamel flux is of the following composition:

| | Percent |
|---|---|
| PbO | 48.8 |
| $SiO_2$ | 25.4 |
| $B_2O_3$ | 7.55 |
| CdO | 3.03 |
| $Na_2O$ | 4.1 |
| $TiO_2$ | 3.42 |
| $Li_2O$ | 1.4 |
| $ZrO_2$ | 6.35 |

Increase of the contents of $ZrO_2$, $TiO_2$ or $SiO_2$ in this latter composition increases the acid resistance and the melting point also. The melting point can be lowered by increasing the content of $Li_2O$ or PbO, or of $Na_2O$ or $K_2O$, either or both.

Although the invention has been described with particular reference to acid resistant glass colors, all colors tested by our method have shown improvement in acid resistance although some would not be classed as being of the acid resistant type. Maximum improvement is had, however, with the acid resistant type colors.

This application is a continuation-in-part of our co-pending application filed June 26, 1951, Serial No. 233,712.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of improving the acid resistance of a vitrifiable lead base glass color comprising applying the color to a ceramic article adapted to have said color fused thereon, heating the article with the applied color to a temperature to fuse the color, and at least while the color reaches and maintains fluidity surrounding at least the color-carrying portion of the article with an atmosphere containing at least 5 per cent of steam.

2. That method of improving the acid resistance of a vitrifiable lead glass color of the acid resistant type comprising applying the color to a ceramic article adapted to have said color fused thereon, heating the article with the applied color to a temperature to fuse the color, and at least while the color reaches and maintains fluidity supplying dry steam around the article.

3. That method of improving the acid resistance of a vitrifiable acid resistant lead glass color comprising applying the color to a glass base, heating the base with the applied color to a temperature to fuse the color, and at least while the color reaches and maintains fluidity supplying surrounding the base with dry steam.

4. That method of improving the acid resistance of a vitrifiable acid resistant lead base glass color comprising applying the color to a ceramic article to be decorated and adapted to have said color fused thereon, then moving the article progressively through a furnace in which it is progressively heated to a temperature zone to fuse the color, and supplying at least to said zone an atmosphere containing at least 5 per cent of steam, then cooling the article.

References Cited in the file of this patent

UNITED STATES PATENTS

| 303,276 | Smith | Aug. 12, 1884 |
| 2,130,215 | Young | Sept. 13, 1938 |
| 2,225,159 | Deyrup | Dec. 17, 1940 |
| 2,273,778 | Berthold | Feb. 17, 1942 |
| 2,314,824 | Greene | Mar. 23, 1943 |
| 2,377,062 | Adams | May 29, 1945 |